US006313925B1

United States Patent
Decker et al.

(10) Patent No.: US 6,313,925 B1
(45) Date of Patent: Nov. 6, 2001

(54) SYSTEM, METHOD, AND PROGRAM FOR SAVING TONER/INK IN A COLOR PRINTER WITHOUT SACRIFICING IMAGE QUALITY

(75) Inventors: William Chesley Decker, Longmont, CO (US); Ho Chong Lee, Endicott, NY (US); Jack Louis Zable, Niwot, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/099,113

(22) Filed: Jun. 17, 1998

(51) Int. Cl.[7] .............................. B41B 15/00; B41J 15/00; B41J 2/205; H04N 1/46; G03F 3/10
(52) U.S. Cl. ........................ 358/1.9; 358/1.13; 358/504; 358/527; 358/529; 358/518; 347/15; 347/43; 347/115; 347/120
(58) Field of Search .................................... 358/504, 528, 358/524, 527, 518, 406, 1.9, 1.13, 529; 347/15, 43, 115, 120, 172; 400/120

(56) References Cited

U.S. PATENT DOCUMENTS

| | | | |
|---|---|---|---|
| 5,299,291 | * | 3/1994 | Ruetz ................................... 358/1.9 |
| 5,309,257 | * | 5/1994 | Bonino et al. ....................... 358/504 |
| 5,323,249 | | 6/1994 | Liang ................................... 358/518 |
| 5,438,649 | | 8/1995 | Ruetz ................................... 395/109 |
| 5,448,379 | | 9/1995 | Ishihara et al. ...................... 358/518 |
| 5,471,324 | | 11/1995 | Rolleston ............................ 358/518 |
| 5,481,655 | | 1/1996 | Jacobs ................................. 395/109 |
| 5,493,321 | | 2/1996 | Zwadlo ................................ 347/131 |
| 5,500,921 | | 3/1996 | Ruetz ................................... 395/109 |
| 5,510,910 | | 4/1996 | Bockman ............................. 358/502 |
| 5,774,238 | * | 6/1998 | Tsukada ............................... 358/518 |

OTHER PUBLICATIONS

Lee, HC, "Proofing Printer Color Rendering Dictionary", Technical Disclosure Bulletin, vol. 40, No. 2, p13–14, Feb. 1997.

Nin, SI, et al., "Printing CIELAB Images on a CMYK Printer Using Tri–linear Interpolation", Research Journal, p1–9, Feb. 1992.

* cited by examiner

Primary Examiner—Edward Coles
Assistant Examiner—Twyler Lamb
(74) Attorney, Agent, or Firm—David W. Victor (57) ABSTRACT

Toner/ink is saved while still being able to print any given color value within the full color gamut of a given printer. Combinations of varying percentages of a printer's toners/inks (cyan, magenta, yellow and black) are determined for maximum black substitution with varying percentages of under color addition (UCA) (e.g., 0%, 50%, 80%, and 100%). Patches of varying combinations of CMYK using maximum black substitution and a given percentage of UCA are printed out, and the color value (L*a*b*) of each patch is measured. Tables are generated having the percentage amounts of C,M,Y, and K and the corresponding measured color value. A first table represents maximum black substitution with 0% UCA. If a desired color value falls within this table, the corresponding CMYK combination represents the most toner/ink that can be saved. If a desired color value does not fall within the first table, subsequent tables representing increasing percentage amounts of UCA are examined. If the color is not found in any of the tables, the requested CMYK is unaltered. When the table is found, the corresponding CMYK combination, found through inversion and interpolation, saves some toner/ink while still being able to print the desired color value contained within that particular color gamut. The method is typically used to build a CMYK-to-CMYK transform table which the printer can use to print multi-color images with the minimum possible toner/ink usage and without sacrificing the image quality.

25 Claims, 3 Drawing Sheets

SYSTEM, METHOD, AND PROGRAM FOR SAVING TONER/INK IN A COLOR PRINTER WITHOUT SACRIFICING IMAGE QUALITY

CROSS REFERENCE TO RELATED APPLICATION

This application is related to Ser. No. 08/813596 U.S. Pat. No. 5,587,168, entitled "A System, Method, and Program For Converting Three Dimensional Colorants To More Than Three Dimensional Colorants" filed on Mar. 25, 1997, assigned to the Assignee hereof, and entirely incorporated herein by this reference.

This application is related to copending patent application Ser. No. 08/823,597 entitled "A System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer" filed on Mar. 25, 1997, assigned to the Assignee hereof, and entirely incorporated herein by this reference.

This application is related to copending patent application Ser. No. 08/823,734 entitled "A System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer By Using A Three Dimensional To Four Dimensional Conversion Process" filed on Mar. 25, 1997, assigned to the Assignee hereof, and entirely incorporated herein by this reference.

This application is related to copending patent application Ser. No. 08/823,731 entitled "An Enhanced System, Method and Program For Converting An Externally Defined Four Dimensional Colorant (CMYK) Into An Equivalent Four Dimensional Colorant Defined In Terms Of The Four Inks (C'M'Y'K') That Are Associated With A Given Printer" filed on Mar. 25, 1997, assigned to the Assignee hereof, and entirely incorporated herein by this reference.

BACKGROUND OF THE INVENTION

1. Field of the Invention

This invention relates to color printing, and more specifically, to determining the amounts of each colorant of a four dimensional colorant (e.g., CMYK) of a specific printer for printing a four dimensional colorant having a desired $L^*a^*b^*$ value with minimum possible toner/ink usage.

2. Description of the Related Art

For additive color processes such as used in display monitors, red, green, and blue are primary colors. In theory, mixing red, green, and blue light in various combinations can produce any color. For example, cyan is a mixture of green and blue and magenta is a mixture of red and blue. Black is the absence of any red, green, or blue; while white contains all three. A display monitor involves an additive process of light, and therefore, any color it produces can be defined in terms of red (R), green (G), and blue (B).

In a printing process, inks are typically deposited on white paper which already reflects the full amount of red, green, and blue. Instead of adding red, green and blue (RGB) together to produce any color, quantities of red, green, and blue are removed to produce a desired color. To do this, filters or inks have to be produced which filter individual primary colors, while not affecting the other two. The filter colors which accomplish this are the colors which are the complement of the primary colors. For example, yellow is the complement of blue. A yellow filter, one which filters out blue light, passes red and green and thus appears yellow. Yellow ink can be thought of as an ink which removes blue. Thus, the complement of blue is yellow; the complement of red is cyan; and the complement of green is magenta. As such, cyan, magenta, and yellow are the primary colors in the subtractive color system and are known as the process colors in the printing industry.

Theoretically, with only three colors of ink: cyan (C), magenta(M) and yellow (Y), a printer could print any color. White can be obtained by putting no ink on the paper; and black can be obtained by putting cyan, magenta, and yellow on the paper, blocking all light. Realistically, however, the color obtained when placing cyan, magenta, and yellow on paper may not be pure black. It may be brownish. Consequently, black ink is typically added to the printing process color set. The black ink not only insures a richer black color, but it also reduces the amount of ink that has to be used to produce most colors. For example, if at any one place on the paper, quantities of C, M, and Y are placed, there will be a gray component which can be removed and replaced with black. This reduces the total amount of ink on the paper and produces better grays and blacks. In addition, it increases the gamut of the color set.

As a theoretical example of this process called black substitution or gray component removal, consider the following:

A color requires Cyan =20%

Magenta =40%

Yellow =60%

In theory, the above color has a 20% gray component, the least common denominator. As such, 20% of each color could be removed and replaced with 20% black. The following will theoretically produce the same color.

New color mix Cyan =0%

Magenta =20%

Yellow =40%

Black =20%

In the above example, 120 units of ink are replaced with 80 units of ink. Thus ink is saved. Colored inks usually cost more than black ink; thereby saving even more.

As shown above, color can be expressed in several ways. A color can be expressed in terms of percentages of RGB (red, green, blue), CMY, (cyan, magenta, yellow) or CMYK (cyan, magenta, yellow, black). None of these color spaces, as they are called, are defined as to what color is produced by mixing combinations of each. Generally, these color spaces are referred to as being device dependent, since the color produced by a given CMYK mix on one printer will not produce the same color on another.

An attempt has been made in the United States to standardize the process color inks so that the colors can be predicted. A standard called SWOP (Specification for Web Offset Publication) has been published which standardized the process ink colors. Recently, this standard has been taken a step further and 928 combinations of CMYK have been defined as to what color will result in a device independent color space (CIE XYZ or CIE $L^*a^*b^*$). In Europe, a standard called Euroscale has been developed for four different paper surfaces. SWOP and Euroscale are very close, but not exactly the same.

In 1931, the organization called the Commission Internationale L'Eclairge (International Commission of Lighting), the CIE, met to try to establish a system of device independent color, color based on human sight. While attempting to define RGB, problems arose which persuaded the members to process the data through a matrix transform which produced a color space called CIE XYZ or XYZ. Since the XYZ color space is based on the human perception of color, any two different colors, even though the spectrum of these two colors may be different, will be perceived as the same color by a human if the XYZ values are the same under given lighting conditions.

From the XYZ color space, additional color spaces have been derived. One of these is called CIE L*a*b*, pronounced C Lab, or L*a*b*. This color space is based on XYZ of the color referenced to XYZ of the light source or paper. Most specifications such as the SWOP standard are specified in terms of XYZ and L*a*b* under a light source such as daylight D50. It is a three component color space with each color specified in terms of L*, a*, and b*. L* specifies the lightness; and the hue and saturation are determined from the values of a* and b*.

L*a*b* to CMY Conversion

Coordinates for device independent color space are specified in L*a*b*. However, printers typically use CMY colors. It is therefore necessary to convert from L*a*b* to CMY. Converting to CMY involves a three dimensional (3D) to three dimensional (3D) conversion process. It should be noted that well known, commonly used, methods can be used to perform 3D to 3D conversions, such as L*a*b* to CMY.

3-D color tables (such as CMY-to-L*a*b*) and transformations among 3-D color spaces are straight forward and unambiguous or unique within the color gamut of the printer; and therefore, inversion schemes (e.g. from L*a*b* to CMY) are available. These schemes involve measurements of color patches of varied color amounts at specified intervals (e.g. creating a 9×9×9 matrix, i.e., 729 patches) to form a CMY lattice and a corresponding L*a*b* (or other color space) lattice (corresponding to CMY 9×9×9 for the example given here). These primary lattices can be denoted by (CMY)p and (L*a*b*)p. An interpolation method is used to establish one-to-one correspondence between points in these lattices. The so called "color rendering dictionaries" are constructed using such interpolation algorithms. If such rendering dictionaries have been established, finding CMY for a given L*a*b value becomes a simpler task.

For example, a L*a*b* to CMY transfer involves making print sample patches using the printer for which the conversion is desired. The print patches are made up of combinations of C, M, and Y. Typically, there are nine patches of each (making a 9×9×9 sample layout having 729 patches) with each color at 0%, 12.5%, 25%, 37.5%, 50%, 62.5%, 75%, 87.5%, and 100%. For each one of the 729 patches the exact percent of cyan, magenta, and yellow is known. Then, each print sample, i.e., patch, is measured and its CIE L*a*b* calculated. A table is created having various percentages of CMY with its corresponding L*a*b* value. To express C, M and Y in terms of equal increments of L*a*b*, known inversion and interpolation techniques are employed. For any given L*a*b* value received as input, that L*a*b* value is located in the table and the corresponding percentages of CMY are found. If the same L*a*b* value is not in the table, interpolation is used or out-of-gamut mapping is used. Out-of-gamut mapping occurs if the L*a*b* value is beyond the volume or color space of colors that a printer is able to produce. Any L*a*b* value that lies within this volume is something that can actually be accurately reproduced by the printer. Since any given printer has its limitations and cannot print every possible color, out-of-gamut means that a given L*a*b* is outside the capability of the printer. There are many well-known out-of-gamut mapping techniques. Basically, these techniques try to get to the point on the surface of the color volume of the printer that is the closest color match.

3D to 4D Conversions

CMY to CMYK Conversion

Converting from CMY to CMYK involves using black generation and under color removal to generate a black component. Under color removal reduces the amount of cyan, magenta, and yellow components to compensate for the amount of black that was added by the black generation. The percentage of black used is the minimum percentage that is used by cyan, magenta or yellow. The altered amount of CMY that is then used is the original amount minus the percentage amount used for black.

For example, for an input file defined in CMY, the conversion to C'M'Y'K is as follows:

K=min (C,M,Y)
C'=C-K
M'=M-K
Y'=Y-K

For this conversion, it is assumed that the inks are a perfect dye such that a mixture in equal amounts of CMY will produce black or a perfect gray, i.e., a block die. The above illustrates one way to convert CMY to CMYK. Other methods of black substitution can also be employed.

A side effect from converting from CMY matrix to CMYK matrix is that the resulting gamut may be reduced, i.e., the range of colors that are produced (the color space) may be reduced, due to loss of hue. This side effect can be compensated for by using an under color addition process. The under color addition process regains lost hues and expands the gamut. This process results in new percentages of CMYK noted below as C"M"Y"K". The process uses the following well-known formulas from classical theory:

$$C'' = \frac{C'}{1-K} = \frac{C-K}{1-K}$$

$$M'' = \frac{M'}{1-K} = \frac{M-K}{1-K}$$

$$Y'' = \frac{Y'}{1-K} = \frac{Y-K}{1-K}$$

L*a*b* to CMYK Conversion

This conversion involves the 3D interpolation scheme and out-gamut mapping scheme discussed above for transforming L*a*b* to CMY. This involved creating CMY patches (e.g., 9×9×9), measuring for L*a*b* values and interpolating, if necessary, to get a CMY value for a given L*a*b* input value. Then the above process for converting CMY to CMYK can be used.

The problem with the above conversion processes, especially the ones that convert CMY to CMYK, i.e. a 3D to 4D conversion, is that these processes are based on theoretical colors and color relationships. A printer may not be capable of producing such theoretical colors.

In addition, since printers typically have four colors, CMYK, for printing, but input files are typically defined using three color values (e.g., RGB, L*a*b*), an equivalent color set of more than three colors must be found for every color obtained with combinations of three primary colors. Transforming a three dimensional system to four or higher dimensions provides no unique solution. The well-known simple scheme described above is based on the ideal dies known as block dies which yields perfect black or grey (w/o hue) whenever equal amounts from C, M, and Y are over-printed over a given area. Then, for any given set of three primaries, an equal amount is removed from each color component and the same amount of black can be added without changing the color value. The amount of ink saved is twice the amount of black added. The amount of CMY replaced can vary from zero to the lowest of the three colorants—a fact which indicates that this process is not unique. For real colorants, combining equal amounts of three colorants will not result in ideal grey/black. Thus, the choice of black replacement becomes ambiguous.

U.S. Pat. No. 5,987,168 entitled "A System, Method, and Program For Converting Three Dimensional Colorants To More Than Three Dimensional Colorants" filed on Mar. 25, 1997, assigned to the Assignee hereof and entirely incorporated herein by this reference, discloses a technique for converting from three colorants to four or more colorants. The technique takes into account the colors and L*a*b* values of the colors that a given printer is actually capable of printing. The technique also uses a fourth color substitution process that results in an unambiguous fourth color replacement percentage amount.

Regardless of the converting technique used, it is important that a printer be able to print a given L*a*b* value using the toners/inks of the printer in order to provide a desired image quality. It is also desirable to minimize the amount of toner/ink consumed in producing the desired color value in order to save costs. However, if the conversion process only takes into consideration a CMYK combination that maximizes the amount of toner saved, the color gamut of the printer may be reduced; thereby sacrificing image quality.

SUMMARY OF THE INVENTION

It is therefore an object of this invention to maximize the amount of toner/ink saved while still being able to print any given L*a*b* value that the printer is capable of printing, i.e., any given L*a*b* value that is within the full color gamut of the printer.

In order to minimize the amount of toner/ink used in printing a color having a desired color value (e.g., L*a*b* value) that is within the full color gamut of the printer, the following steps are undertaken.

Using combinations of varying percentage amounts of cyan, magenta, and yellow, where none of the percentage amounts of C, M, or Y is zero, a maximum (100%) black substitution is calculated for each C,M,Y combination to get a new C'M'Y'K' combination. A computer is programmed to perform these calculations. Patches of these new C'M'Y'K' combinations are printed out by the given printer. The color value, L*a*b*, for each of these patches is measured using a spectrophotometer or other color value measuring device. The percentage amounts of the C'M'Y'K' combinations and the corresponding measured color values are inputted into a programmed computer which generates a table of values for maximum black (K) substitution.

For each C'M'Y'K' combination, a programmed computer calculates new C"M"Y"K" combinations at varying percentages of under color addition (UCA) such as 50%, 80% and 100%. For each percentage amount of UCA, patches are printed of the C"M"Y"K" combinations, and each patch is measured for its color value. The percentage amounts of each combination along with the corresponding measured color value are inputted into a programmed computer to generate a file containing tables at each percentage amount of UCA.

When the printer is to print a color having a desired color value, the printer controller determines to see if the color value falls within the color values in the first table for maximum K substitution. If it does, inversion and interpolation techniques are used on the table to determine the CMYK combination for that color value. Since the first table is representative of the color values that can be produced using maximum K substitution, producing a color from this table ensures that a maximum amount of toner/ink is saved.

If the desired color value is not found within the first table, the next tables, in increasing percentages of UCA, are searched (i.e., the table representing 50% UCA is searched first, then the table representing 80% UCA is searched next, then the table representing 100% UCA is searched last) to determine into which table the desired color value falls. When the table is found, inversion and interpolation techniques on that table are used to determine the CMYK combination that will produce the desired color value. If the desired color does not belong to any of the gamut tables, no conversion is made, and the original CMYK along with its color value is preserved. This typically happens when at least one of CMY is zero, and also when the color value lies outside the last gamut which happens to be smaller than the printer's entire gamut.

Each of the above tables, in increasing percentages of UCA, increases the gamut size to allow the printing of more color values. The smallest gamut (for maximum K substitution) saves the most toner/ink for those color values falling within this table. For color values falling outside of this smallest gamut, some toner/ink is being saved while still being able to print that specifically desired color value by using the next appropriate table.

If the color is not found, even in the 100% UCA table, the input color is not transformed and the output value is the same as the input value. No toner is saved for this CMYK combination.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

To characterize a printer having multiple colors of toners or inks, a matrix of patches having varying amounts of each color are printed. Although a preferred embodiment of the invention will be described using cyan, magenta, yellow and black (CMYK) as each of the colors, other colors could be used. Then each patch is measured for its corresponding L*a*b* value. For example, a matrix of 5×5×5×5 patches of CMYK would result in 625 patches. A matrix of 9×9×9×9 patches of CMYK would result in 6561 patches. Other sized matrixes could also be used, including the intervals used in the standard SWOP table. The preferred embodiment used a 9×9×9×9 sized matrix. Although this involved more measurements and more data, it provided more accuracy. Regardless of the size of the matrix generated, each patch would be measured for its corresponding L*a*b* color value. A table can then be generated which has each of the various percentage amounts (from 0% to 100%) of each C, M, Y, and K in a CMYK combination and a measured L*a*b* value associated with each such combination of CMYK. The table would then be characteristic of the full color gamut for that printer.

Once a printer has been characterized, it can print, within its limitations, one of many color combinations for a "desired color" or L*a*b* value. There are multiple, if not an infinite number of CMY and K combinations that will have the same L*a*b* value.

This invention relates to using a minimal amount of toner/ink when printing a color combination of CMYK which has a desired L*a*b* value. This is accomplished without reducing the color gamut of the printer, i.e., without sacrificing the print or color quality. It should be noted that merely optimizing the saving of toner/ink will reduce the gamut of available colors (i.e., L*a*b* values) that can be printed. As such, the following described toner saver system, method, and program takes into consideration the full color gamut of the printer such that the amount of toner saved is optimized for any desired L*a*b* value that the printer is fully capable of printing.

A key point is that for many L*a*b* values, there are an infinite number of CMYK combinations that will yield the same L*a*b* values. The objective of the system, method, and program of this invention is to find one of the many CMYK combinations, having a given L*a*b* value, which uses the least amount of toner/ink. That is, for a given L*a*b* value or "desired color", the objective is to find which CMYK combination having that L*a*b* value or "desired color" uses the least amount of toner/ink.

Figure 1:
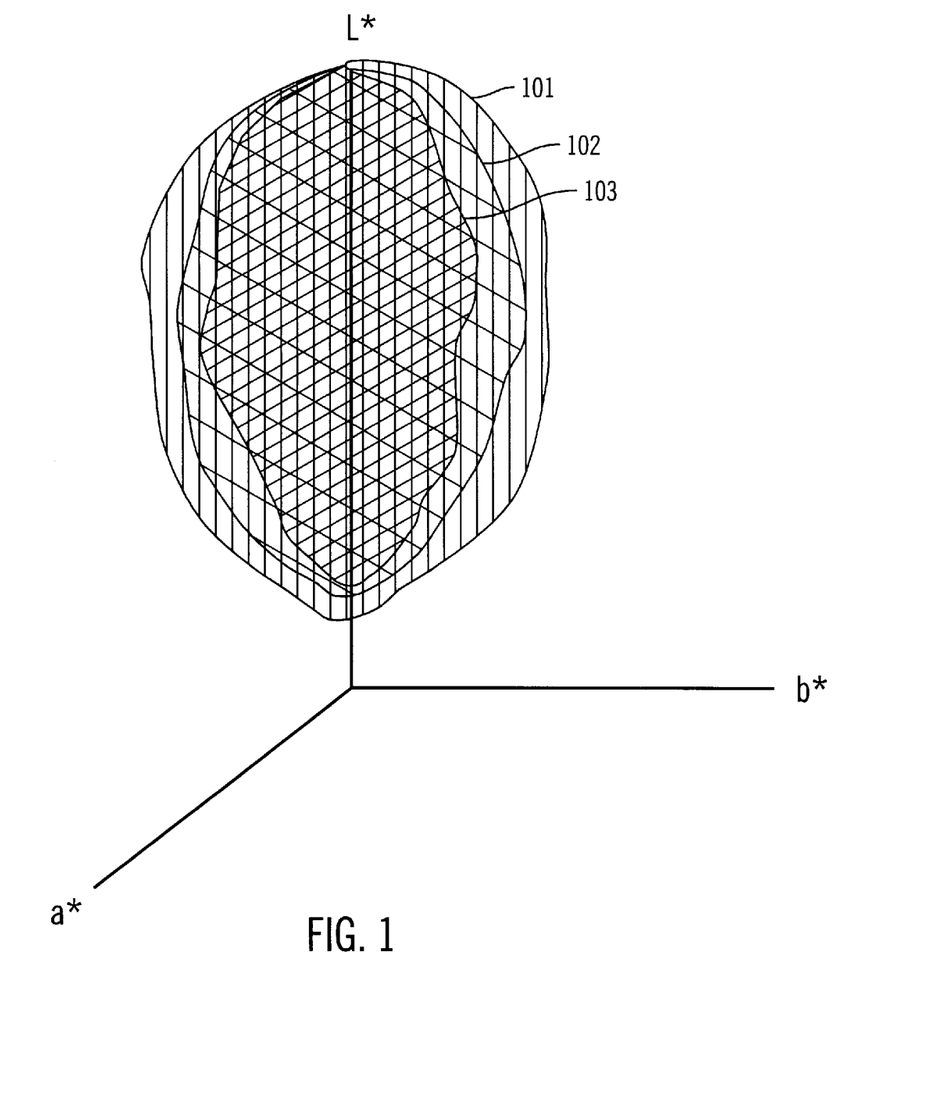
FIG. 1 illustrates various color gamuts of a printer.

A printer can have one or more color gamuts. The full printer gamut is characterized by the measured L*a*b* values of combinations of CMYK having varying percentages (From 0% to 100%) of each color component C, M, Y, and K, as discussed above. Furthermore, for example, separate color gamuts of the printer can be defined for each varying percentage amount (from 0% to 100%) of black (K) substitution. The printer can also have color gamuts that reflect varying percentages of under color addition (UCA). That is, various color gamuts can be defined for variations of K substitution from 0–100% in combination with variations of under color addition (UCA) from 0–100%. FIG. 1 shows a full color gamut 101 of a printer. Ideally, the full color gamut 101 is achieved with maximum K substitution and with maximum under color addition (UCA). In reality, however, the maximum UCA gamut is equal to a smaller gamut than the printer's full gamut. A smaller gamut 102 is shown as a result of using maximum K substitution with 50% UCA. This same gamut may also be achieved using a percentage of K substitution in combination with a percentage of under color addition, e.g., 70% K substitution with 30% UCA. The smallest gamut 103 is achieved with maximum K substitution and 0% UCA. Each gamut, 101, 102, 103 as shown in FIG. 1, defines a three dimensional space containing the corresponding L*a*b* values within each gamut.

Referring to the block die again, for illustration, in carrying out maximum K (i.e., black) substitution, the lowest common denominator in percentage amounts of C, M, or Y is used. If, for example, the percentages of C, M, and Y are equal to 10, 20, 30, respectively; 10 is the lowest common denominator. Ten percent of each of C, M, and Y would be removed and 10% of K would be put back into the color combination.

As another example, if C, M, and Y are equal to 0.2, 0.3, and 0.5, respectively, then for 100% K substitution (or maximum substitution), the new values C', M', Y', K would be 0, 0.1, 0.3, and 0.2, respectively.

For 50% K substitution, the new values C', M', Y', K' would be 0.1, 0.2, 0.4, and 0.1, respectively, given the values above of C, M, and Y of 0.2, 0.3, and 0.5, respectively.

The formula for each color for full or 100% under color addition (UCA), is C'/1-K, M'/1-K, Y'/1-K, respectively where C', M', Y' are the new values after K substitution and K is the K substitution value that was used. For varying percentages of UCA, the percentage is taken from K in the denominator. That is, for 50% UCA the formulas would be C'/1−0.5K, M'/1−0.5K, Y'/1−0.5K.

The above examples are illustrated in the table below.

|  | C | M | Y |  | TOTAL AMOUNT OF TONER/INK |
|---|---|---|---|---|---|
|  | .2 | .3 | .5 |  | 1.0 |
|  | C' | M' | Y' | K |  |
| 0% K substitution 0% UCA | .2 | .3 | .5 |  | 1.0 |
|  | C' | M' | Y' | K |  |
| 100% K substitution w/0% UCA | 0 | .1 | .3 | .2 | 0.6 |
|  | C" | M" | Y" | K |  |
| 100% K substitution w/50% UCA | 0 | .11 | .33 | .2 | 0.64 |
|  | C" | M" | Y" | K |  |
| 100% K substitution w/80% UCA | 0 | .12 | .36 | .2 | 0.68 |
|  | C" | M" | Y" | K |  |
| 100% K substitution w/100% UCA | 0 | .125 | .375 | .2 | 0.7 |
|  | C' | M' | Y' | K |  |
| 50% K substitution w/0% UCA | .1 | .2 | .4 | .1 | 0.8 |
|  | C" | M" | Y" | K |  |
| 50% K substitution w/50% UCA | .105 | .21 | .42 | .1 | 0.835 |
|  | C" | M" | Y" | K |  |
| 50% K substitution w/100% UCA | .11 | .22 | .44 | .1 | 0.87 |

As seen above, 40% of toner/ink is saved using 100% K substitution and 20% of toner/ink is saved using 50% K substitution, when no under color addition is used. Hopefully, when a K substitution is made, the color will remain the same. Realistically, when a K substitution is applied to the CMY matrix, some of the color hue may be lost resulting in a smaller gamut. To regain the hue, under color addition (UCA) may be used. Under color addition adds more toner/ink back into the color composition. Although this diminishes the amount of toner that is being saved, it increases the color gamut of the printer. As shown above, for each amount of K substitution, more toner/ink is used as the percentage amount of UCA increases.

The most toner/ink that can ever be saved is when 100% black substitution is used. This is maximum toner saving. However, the problem with using 100% black substitution is that it may shrink the color gamut for that printer.

The method of this invention utilizes a combination of techniques to optimize toner saving while not sacrificing the ability to print all possible L*a*b* values within the full color gamut of the printer.

Figure 2:
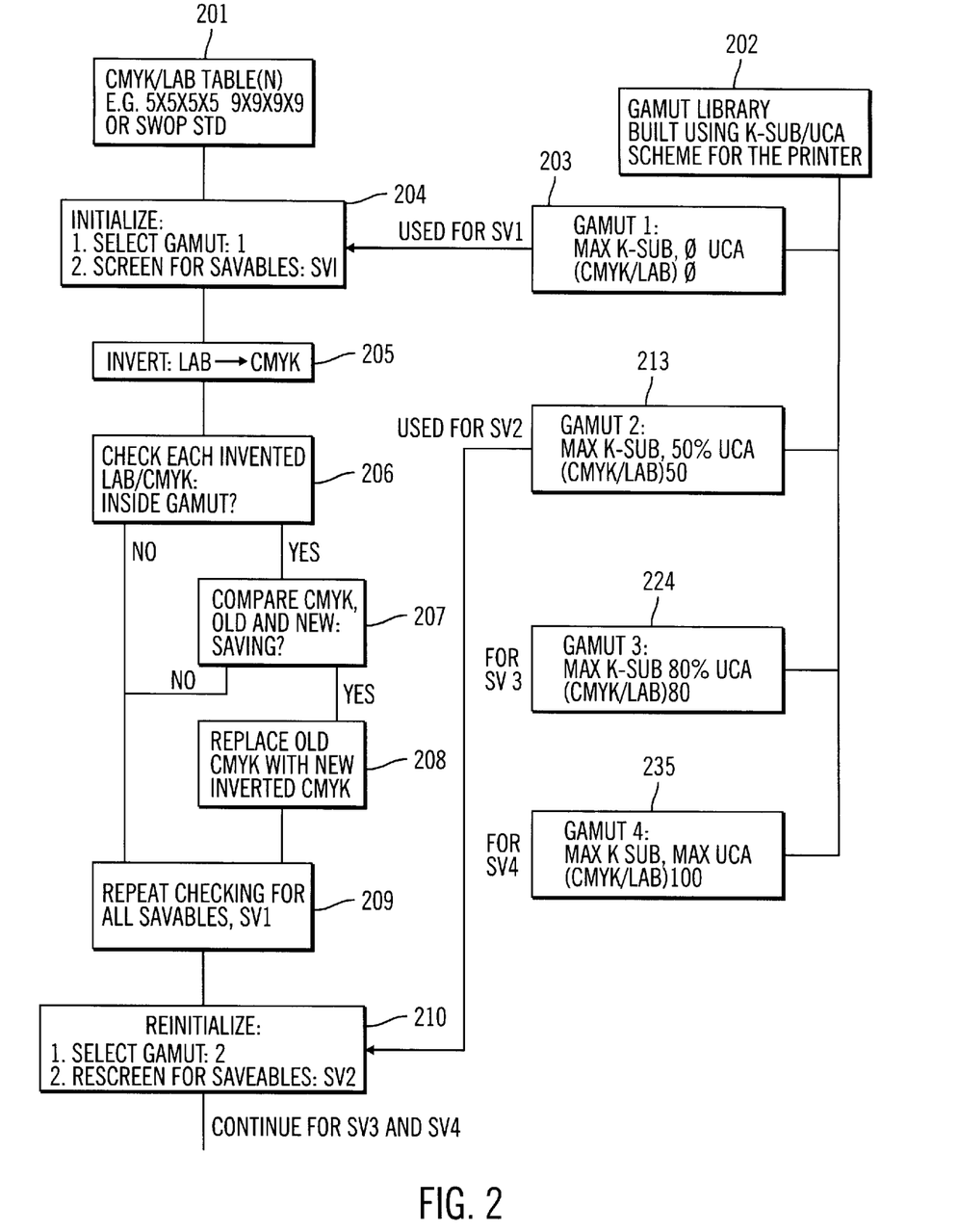
FIG. 2 illustrates the method steps of the invention including creating and using tables of CMYK values and L*a*b* values which are representative of various sized gamuts of a printer in determining a CMYK combination using a lesser amount of toner in order to obtain a color having a given L*a*b* value.

The following description references FIG. 2. First a matrix (possibly 9×9×9×9) of patches of varying percentages of C, M, Y, K are printed by the printer. L*a*b* values are measured for each patch. A table is then generated correlating the various CMYK combinations with the respective measured L*a*b* value, 201. This represents the full color gamut of the printer, such as gamut 101 of FIG. 1. The objective is to replace CMYK combinations in the table, whenever possible, with new CMYK combinations which produce the same L*a*b* value with minimum toner usage. In step 201, it is indicating that one may start with the SWOP standard table in which L*a*b* values are already specified for various combinations of CMYK. In this case the object is to transform the SWOP table for minimum toner usage.

For each C, M, Y combination from the above, that is 9×9×9 table with K=0, for example, new values C', M', Y', and K' are determined using maximum K substitution and without any UCA (i.e., 100% K and 0% UCA). Patches of each of these combinations C', M', Y', and K' are printed out, and the L*a*b* values are measured. This results in the smallest gamut, such as 103 of FIG. 1. A table is created with the C'M'Y'K' values and the corresponding L*a*b* values, 203. If any L*a*b* value in table 201 or any other L*a*b* value desired to be printed falls within the L*a*b* values within the solid interior of 103, then this 100%K/0% UCA table, 203, can be used to find a corresponding $(CMYK)_T$ combination through inversion and interpolation, 204, 205. Then, this $(CMYK)_T$ combination will use the least amount of toner/ink, i.e., it will save the most. Therefore, if the L*a*b* value falls within this gamut 103, steps 206, 207, 208, the color can be accurately reproduced because the same L*a*b* value can be generated, and the minimal toner has been used.

Since the gamut 103 is substantially smaller than the full color gamut of the printer 101, there may be desired L*a*b* values that fall within the region between 101 and 103. These values are handled by any one of the following further tables 213, 224, 235 that are generated when building a gamut library of CMYK/L*a*b* values using a K substitution/UCA scheme for the printer, step 202.

For the above original CMY combinations, e.g., 9×9×9 or 5×5×5, which rendered new C'M'Y'K' values for maximum K substitution, new C"M"Y"K' values are determined for 50% under color addition, i.e., these C"M"Y"K' values are determined at 100% K and 50% UCA. Patches of each of these C"M"Y"K' combinations are printed; and the L*a*b* value of each patch is measured. A second table 213 is then created having C"M"Y"K' combinations and corresponding L*a*b* values. These L*a*b* values define a gamut such as 102 that is larger than the color gamut 103 using only maximum K substitution with no under color addition, but the defined gamut is smaller than the full color gamut 101 of the printer. If a desired L*a*b* value falls outside of the smallest gamut 103 with maximum K substitution, but within gamut 102 defined by maximum K substitution with 50% UCA, then this second table 213 is used to find a corresponding $(CMYK)_T$ combination through inversion and interpolation. This combination uses essentially the least amount of toner possible while still being able to achieve a color having a desired L*a*b* value belonging between the volume 103 and 102.

The above steps are repeated using incrementally more toner in order to increase the gamut to be able to print a desired L*a*b* value belonging outside the previous gamuts. If the color is not within the gamut using 100% K sub and 100% UCA, no K sub is chosen and the CMYK value requested is not altered, i.e., CMYK in=CMYK out.

For example, for the above original CMY combinations, e.g., 9×9×9 or 5×5×5, which rendered new C'M'Y'K' values for maximum K substitution, new C"M"Y"K' values may be determined for 80% and 100% under color addition, i.e., these C"M"Y"K' values are determined at 100% K and 80% UCA, and then for 100% K and 100% UCA. Patches of each of these C"M"Y"K' combinations are printed; and the L*a*b* value of each patch is measured. Additional tables 224, 235 for each percentage of UCA are then created having C"M"Y"K' combinations and corresponding L*a*b* values.

Although the tables described above were created for 0% UCA, 50% UCA, 80% UCA, and 100% UCA, other increments could be used. As more increments in the percentage of UCA are used, more data must be gathered and more tables must be created. However, the saving of toner becomes more fine tuned by optimizing the saving of toner for just the right percentage amount of under color addition that is needed to increase the gamut to just that desired L*a*b* value. That is, the saving of toner is ultimately optimized for just the right gamut size that is necessary to include the desired L*a*b* value when the desired L*a*b* value falls on a boundary line that defines the surface of the gamut space defined by a determined percentage of K substitution and a determined percentage of UCA. This amount of fine tuning may not be realistically necessary in view of the amount of data that must be gathered for an incremental saving in toner. More broadly defined boundaries (e.g., such as by 2–4 different percentages of UCA) may be all that is needed to optimize the saving of toner for L*a*b* values that fall within predetermined incremental gamut spaces.

The amount of data that is gathered, in tables 203, 213, 224, and 235, can be minimized since a CMY combination does not need to be considered for maximum K substitution if any one of C, M, or Y has a zero value. The CMY combination with at least one of the components having a zero value is already optimized as to the minimal amount of toner/ink used. This is also true for the table in step 201, e.g., 9×9×9 or 5×5×5, as the entries with at least one colorant zero need not be inverted. This does not apply for the case when the SWOP standard table is to be transformed as each L*a*b* must be inverted in the printer's gamuts including out of gamut mapping. As such, a screening process is used which finds the combinations of CMY where additional toner saving is possible, i.e., screening for savables, step 204. Therefor, utilizing the table in 201, in a 5×5×5 matrix of a possible 125 patches, only 64 patches would need to be additionally printed and measured using a maximum K substitution with 0% UCA or other under color additions. This essentially makes a 4×4×4 matrix, since the value of zero of any of the components is being ignored. Likewise, if a 9×9×9 matrix were used, only 512 patches would need to be printed and measured instead of a possible 729.

The tables created are combined into one table. If a desired L*a*b* value falls into the first region of the table created from maximum K substitution with 0% UCA, then a minimum amount of toner will be used to generate that color. If the desired L*a*b* value does not fall within that first region, then the regions that it does fall into is determined, steps 206–210. When the region of the L*a*b* value is found, then the corresponding C"M"Y"K" value is determined through inversion and interpolation. That C"M"Y"K" value will save the most toner that is possible while still being able to generate a quality image with a desired color value.

In conclusion, maximum (100%) K substitution with 0% under color addition (UCA) will result in the most toner saved, but it will have smallest gamut. Maximum K substitution with 100% UCA will result in using the most toner/ink, i.e. saving the least for that maximum K combination, but will result in the largest gamut. All other combinations of maximum K substitution with varying percentage amounts of UCA will fall somewhere between these two boundaries. In addition, varying the amount of K substitution (i.e., using 50%, 80% of K substitution) in combination of varying percentage amounts of UCA may also allow for some toner saving while still being able to print a desired L*a*b* value. Any such resulting gamuts will fall between the full color gamut 101 and the smallest gamut 103 using 100% K substitution with 0% UCA.

It should be noted that the maximum (100%) UCA saves the least for a given percentage amount of K. It is not necessarily saving the least for all the possible combinations of CMY and K, but it is saving the least for that given percentage amount of K. Once a given percentage amount of K substitution has been chosen, maximum UCA saves the least; but it results in a larger gamut.

FIG. 2 describes a systematic means of generating the transformed table from CMYK of 201 to the optimized CMYK, elements of which are less than or equal to the corresponding elements of table 201. In essence, the process starts with the CMYK/L*a*b* table of 201, and in the first step, only the L*a*b*'s of 201 in the smallest gamut, 203, are inverted to replace the corresponding CMYK with C'M'Y'K'. The computer program can be written to invert only the L*a*b* values which are in the gamut specified. Of the remaining L*a*b*'s, in the next step, those L*a*b*'s in the next larger gamut, 213, are inverted and the corresponding CMYK are replaced with the new C"M"Y"K". Again, this is accomplished by the computer by specifying 213 as the gamut to be used in the inversion. This continues until the largest gamut, 235, has been used as the last inversion. There is no guarantee that the largest gamut, 235, with 100% UCA, coincides with the printer's full gamut, 101, and more likely it is smaller. There are, therefore, some L*a*b*'s in table 201, which will not be inverted, and the corresponding CMYK not modified. The entries with at least one of CMY equal to zero belong to this category. The original CMYK and the newly transformed CMYK constitute the CMYK-to-CMYK transform table for the optimum toner saving. This table can be used in 4-D interpolation for printing CMYK images with reduced toner usage by the printer.

The toner/ink used by a printer may not conform to the SWOP standard, and it is sometimes necessary to generate the transform table to be used to handle SWOP based images by the printer using the toner saving feature. If the SWOP standard table is used for the table 201, and the SWOP specified L*a*b*'s are inverted as described in the steps of FIG. 2, the desired transform table SWOP CMYK to the printer's CMYK with minimum toner usage is generated. It is noted that in this case, every L*a*b*, including those with at least one CMY equal to zero, must be inverted and the final out-of-gamut mapping performed on the last (the largest) gamut.

Once the above tables have been generated, the color transform table file can then be sent and loaded into a printer controller or loaded onto a storage medium such as a diskette. If the color transform table is stored on a storage medium, the color transform table can be permanently stored into the printer controller via the storage medium, or it can be loaded into the printer controller by the print driver as required by the print job.

Figure 3:
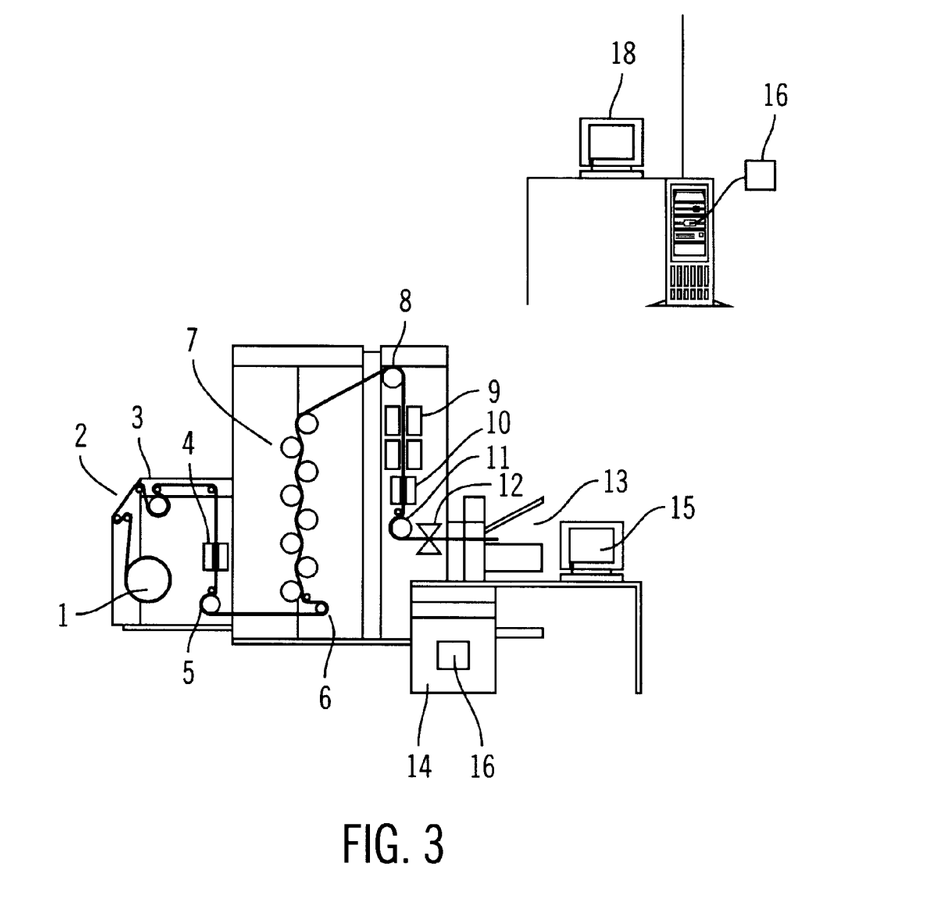
FIG. 3 shows the components of a printer.

FIG. 3 is a block diagram showing a typical printing system for carrying out the features of the preferred embodiment of this invention. Also, this and other printing systems can be modified via the printer controller 14 to incorporate the features of the preferred embodiment of this invention. The printing system shown includes a paper reel 1, splicing table 2, paper drying roll 3, paper cooling 4, paper condition sensor 5, speed motor 6, printing stations 7, top roller 8, fuser 9, paper cooling 10, torque motor 11, cutter 12, and stacker 13. The printing station 7 comprises front and back printing engines for the various colors of ink used by the printer, such as cyan, magenta, yellow, and black. For more colors of ink, additional pairs of print engines would be contained within the printing station. The computer 18 is used to input the color transform table data as described to create a color transform table file 16.

Using the foregoing specification, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more printing systems and/or processing systems including, but not limited to, cpu, memory/storage devices, communication links, communication/transmitting devices, servers, I/O devices, or any subcomponents or individual parts of one or more printing systems and/or processing systems, including software, firmware, hardware or any combination or subcombination thereof, which embody the invention as set forth in the claims.

One skilled in the art of computer science will easily be able to combine the software created as described with appropriate general purpose or special purpose computer hardware and/or printer hardware to create a computer/printer system and/or computer/printer subcomponents embodying the invention and to create a computer/printer system and/or computer/printer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims.

For example, any number of patches can be printed out and measured for its corresponding color value. A certain size matrix or specific percentage values are not required. Also, unequal increments of each color can be utilized, where the increments are based upon piecewise linear steps of each color. Although the invention has been described in terms of L*a*b*, any device independent color values can be used. Also, although the invention has been described and claimed in terms of CMYK (which typically refers to cyan, magenta, yellow, and black), other colors can be used for any one or all of these color components.

We claim:

1. A method for printing a color having a desired color value using a combination of different colored toners or inks in a printer, the method comprising:

generating a plurality of tables for the printer having various combinations of varying percentage amounts of each colored toner or ink and having a measured color value for each combination, each table representing a different gamut size as a result of using a different percentage amount of under color addition for a given percentage amount of black substitution;

determining one table which contains the desired color value; and using only the determined table from the plurality of tables to determine the combination of percentage amounts of each color to generate the desired color value with the printer;

whereby the amount of toner or ink consumed in printing the determined combination is minimized for the desired color value.

2. The method of claim 1 wherein the given percentage amount of black substitution is 100 per cent.

3. The method of claim 1 further comprising the step of generating a single CMYK to C'M'Y'K' transform table based upon a combination of the plurality of tables into a single composite table which is loadable into the printer to save toner without altering a requested color.

4. The method of claim 1, wherein generating the plurality of tables using a different percentage amount of under color addition further comprises:

generating a first gamut table using a maximum amount of under color addition; and generating at least one additional gamut table using less than the maximum amount of under color addition.

5. The method of claim 4, wherein determining which table contains the desired color value comprises determining the gamut table generated using the least amount of under color addition that includes the desired color value.

6. The method of claim 5, wherein a plurality of additional gamut tables are generated using different percentage amounts of under color addition that is less than the maximum amount of under color addition.

7. A method for printing a color value using a combination of different colored toners or inks in a printer, the method comprising:

printing patches of varying percentage amounts of each colored toner or ink wherein the varying percentage amounts are determined using a given percentage amount of black substitution with varying percentage amounts of under color addition;

measuring the color value of each printed patch;

generating a plurality of tables for the printer having various combinations of varying percentage amounts of each colored toner or ink and having a measured color value for each combination, each table representing a different gamut size as a result of using a different percentage amount of under color addition for the given percentage amount of black substitution;

determining one table which contains the desired color value with the printer; and using only the determined table from the plurality of tables to determine the combination of percentage amounts of each color to generate the desired color value;

whereby the amount of toner or ink consumed in printing the determined combination is minimized for the desired color value.

8. The method of claim 7 wherein the given percentage amount of black substitution is 100 per cent.

9. A method for printing a color having a desired color value using a combination of different colored toners or inks in a printer, the method comprising:

receiving input, into a computer program, of combinations of varying percentage amounts of each colored toner or ink, wherein the varying percentage amounts reflect a given percentage amount of black substitution with varying percentage amounts of under color addition, and corresponding measured color values for each combination;

generating a plurality of tables for the printer having various combinations of varying percentage amounts of each colored toner or ink and having a measured color value for each combination, each table representing a different gamut size as a result of using a different percentage amount of under color addition for the given percentage amount of black substitution;

determining, upon input of a desired color value, one table to which the desired color value belongs; and determining a color combination from only the table determined from the plurality of tables corresponding to the desired color value; wherein the color table corresponding combination saves toner or ink for the desired color value in a given gamut.

10. The method of claim 9 wherein the given percentage amount of black substitution is 100 per cent.

11. The method of claim 9, wherein generating the plurality of tables using a different percentage amount of under color addition further comprises:

generating a first gamut table using a maximum amount of under color addition; and generating at least one additional gamut table using less than the maximum amount of under color addition.

12. The method of claim 11, wherein determining which table contains the desired color value comprises determining the gamut table generated using the least amount of under color addition that includes the desired color value.

13. The method of claim 12, wherein a plurality of additional gamut tables are generated using different percentage amounts of under color addition that is less than the maximum amount of under color addition.

14. The method of claim 9 wherein the step of determining is performed through the steps of inversion and interpolation.

15. A method for printing a color having a desired color value using a combination of different colored toners or inks in a printer, the method comprising:

printing patches of combinations of varying percentage amounts of each colored toner or ink wherein the varying percentage amounts are determined using a given percentage amount of black substitution with varying percentage amounts of under color addition;

measuring the color value of each printed patch;

inputting into a computer program the combinations of varying percentage amounts of each colored toner or ink, and corresponding measured color values for each combination;

generating, by the computer program, a plurality of tables for the printer having various combinations of varying percentage amounts of each colored toner or ink and having a measured color value for each combination, each table representing a different gamut size as a result of using a different percentage amount of under color addition for the given percentage amount of black substitution; and using the computer program to determine a color combination from only one of the tables having a desired color value; wherein the color combination saves toner or ink for the desired color value in a given gamut represented by the one table.

16. The method of claim 15 wherein the given percentage amount of black substitution is 100 per cent.

17. A file, on a medium, for use in a printer controller of a printer for printing a color having a desired color value using a combination of different colored toners or inks in a printer, the file comprising:

a plurality of tables having various combinations of varying percentage amounts for each colored toner or ink and having a measured color value for each combination; and each table representing a different gamut size of the printer as a result of using a different percentage amount of under color addition for a given percentage amount of black substitution.

18. A system for printing a color value using a combination of different colored toners or inks in a printer, the system comprising:

means for generating a plurality of tables having various combinations of varying percentage amounts of each colored toner or ink and having a measured color value for each combination, the plurality of tables comprising, a first table representing a smallest color gamut of the printer wherein the varying percentage amounts of each colored toner or ink reflects a given percentage amount of black toner/ink substitution with no under color addition whereby a least amount of toner or ink is used in the percentage amounts to generate the color values within the smallest gamut;

subsequent tables representing increased gamut sizes by increasing the percentage amount of under color addition for the given percentage amount of black toner/ink substitution and thereby increasing the amount of toner or ink needed to generate a combination having the desired color value within one of the increased gamut size;

means for determining one table which contains the desired color value; and means for using only the determined table from the plurality of tables to determine the combination of percentage amounts of each color to generate the desired color value;

whereby the amount of toner or ink consumed in generating the determined combination is minimized for the desired color value.

19. The system of claim 18 wherein the given percentage amount of black substitution is 100 per cent.

20. A system for printing a color having a desired color value using a combination of different colored toners or inks in a printer, comprising:

means for receiving input, into a computer program, of combinations of varying percentage amounts of each colored toner or ink, wherein the varying percentage amounts reflect a given percentage amount of black substitution with varying percentage amounts of under color addition, and corresponding measured color values for each combination;

means for generating a plurality of tables for the printer having various combinations of varying percentage amounts of each colored toner or ink and having a measured color value for each combination, each table representing a different gamut size as a result of using a different percentage amount of under color addition for the given percentage amount of black substitution;

means for determining, upon input of a desired color value, one table to which the desired color value belongs; and means for determining a color combination from the only the table determined from the plurality of tables corresponding to the desired color value; wherein the color table corresponding combination saves toner or ink for the desired color value in a given gamut.

21. The system of claim 20 wherein the given percentage amount of black substitution is 100 per cent.

22. The system of claim 20, wherein the means for generating the plurality of tables using a different percentage amount of under color addition further comprises:

means for generating a first gamut table using a maximum amount of under color addition; and means for generating at least one additional gamut table using less than the maximum amount of under color addition.

23. The system of claim 22, wherein the means for determining which table contains the desired color value comprises determining the gamut table generated using the least amount of under color addition that includes the desired color value.

24. The system of claim 23, wherein a plurality of additional gamut tables are generated using different percentage amounts of under color addition that is less than the maximum amount of under color addition.

25. A method for printing a color having a desired color value using a combination of different colored toners or inks in a printer, the method comprising:

maintaining a plurality of tables for the printer having various combinations of varying percentage amounts of each colored toner or ink and having a measured color value for each combination, each table representing a different gamut size for the printer;

selecting one table containing the desired color value; and using only the selected table of the plurality of tables to determine the combination of percentage amounts of each color to generate the desired color value with the printer.

* * * * *